United States Patent
Fadili et al.

(10) Patent No.: US 8,737,601 B2
(45) Date of Patent: May 27, 2014

(54) ECHO CANCELLER

(75) Inventors: Moulay Fadili, Paris (FR); Labib Zargouni, Paris (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/700,465

(22) PCT Filed: May 23, 2011

(86) PCT No.: PCT/EP2011/058317
§ 371 (c)(1), (2), (4) Date: Feb. 4, 2013

(87) PCT Pub. No.: WO2012/004043
PCT Pub. Date: Jan. 12, 2012

(65) Prior Publication Data
US 2013/0129078 A1    May 23, 2013

(30) Foreign Application Priority Data
Jul. 5, 2010  (EP) .................................. 10168440

(51) Int. Cl.
*H04M 9/08* (2006.01)
*H04B 1/38* (2006.01)

(52) U.S. Cl.
USPC ...................................... 379/406.08; 455/570

(58) Field of Classification Search
None
See application file for complete search history.

(56) References Cited

U.S. PATENT DOCUMENTS

| 5,377,257 A * | 12/1994 | Shirasaka et al. ............ 379/67.1 |
| 7,085,370 B1 * | 8/2006 | Arana-Manzano et al. .. 379/377 |
| 2009/0257579 A1 | 10/2009 | Takada |

FOREIGN PATENT DOCUMENTS

WO    WO-0203376 A2    1/2002

OTHER PUBLICATIONS

International Search Report PCT/ISA/210 for International Application No. PCT/EP2011/058317 dated Jun. 6, 2011.

* cited by examiner

*Primary Examiner* — Fan Tsang
*Assistant Examiner* — Jeffrey Lytle
(74) *Attorney, Agent, or Firm* — Harness, Dickey & Pierce

(57) ABSTRACT

The proposed echo canceller comprises:—an adaptive filter for receiving a signal affected by an echo, and for supplying a filtered signal that is an estimate of the echo;—a subtractor for subtracting this estimate from the received signal and supplying a residual signal;—means for detecting (7, 8) a ring back tone in said residual signal;—means for blocking (9) the received signal and replacing it by a locally generated ring back tone if a ring back tone is detected in the received signal;—a timer to determine a time period;—and means (11-17) for, during said time period, replacing the residual signal by some synthetic comfort noise when there is no ring back tone.

4 Claims, 4 Drawing Sheets

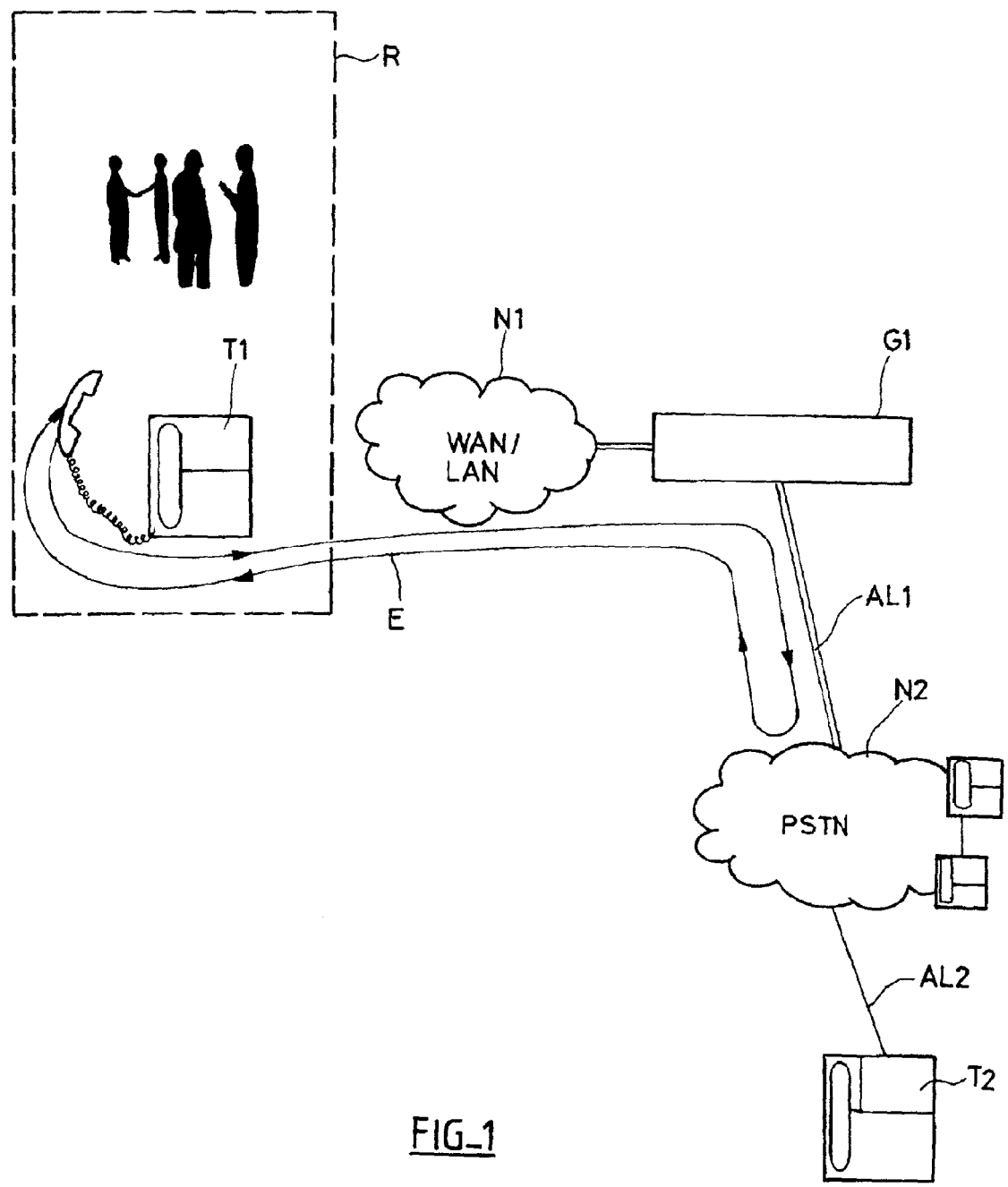
FIG_1

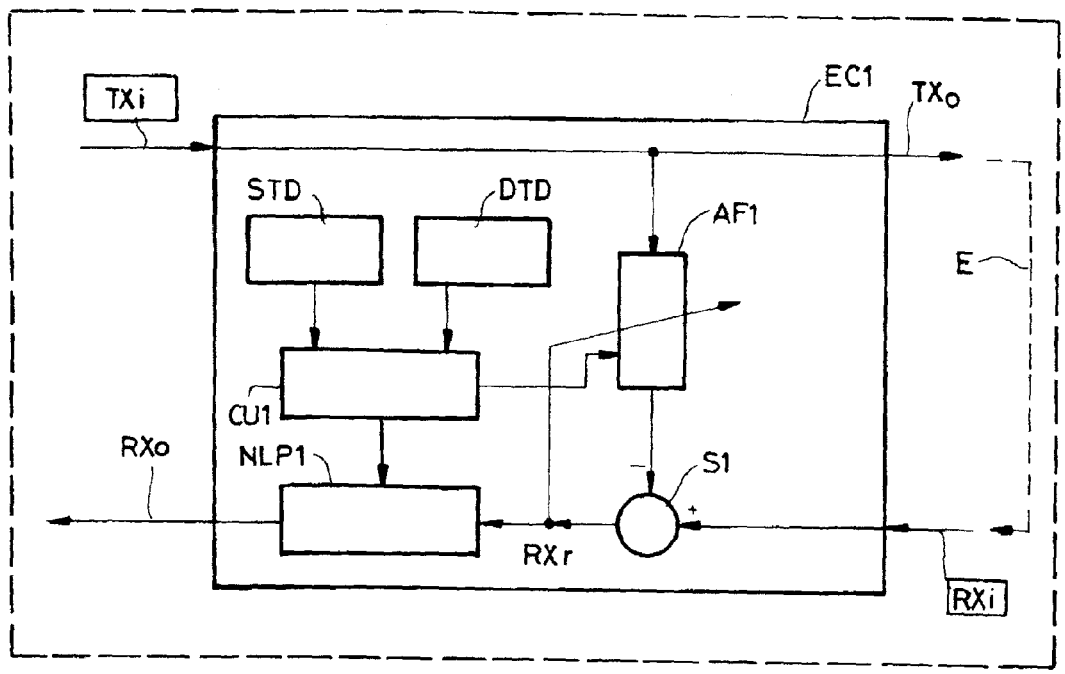
FIG_2
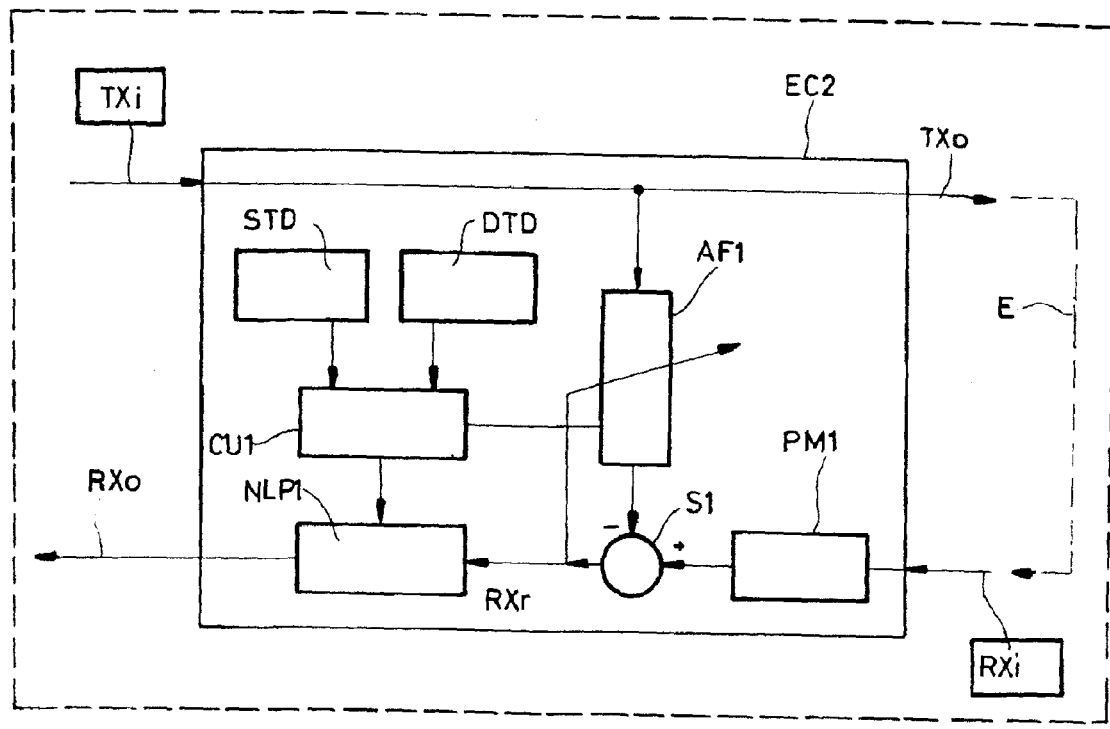
FIG_3

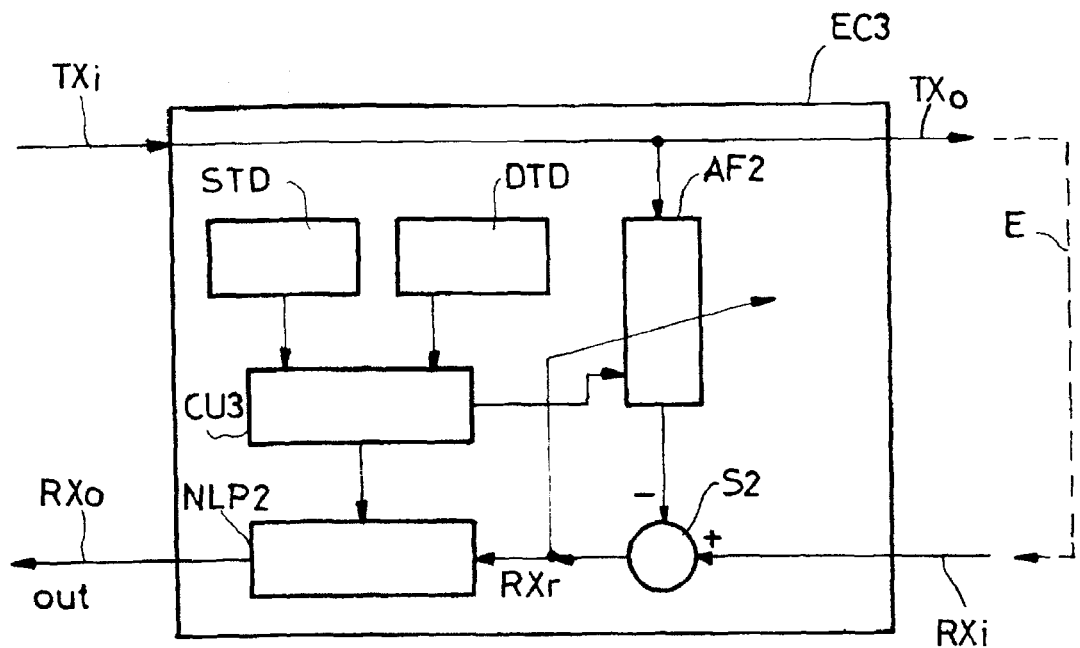
FIG_4
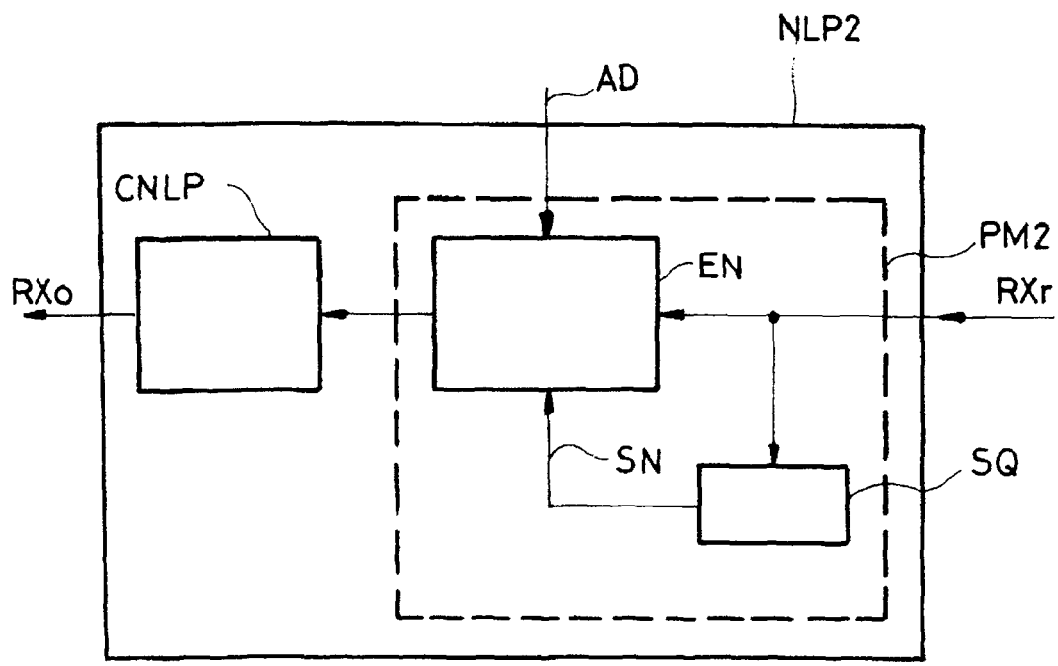
FIG_5

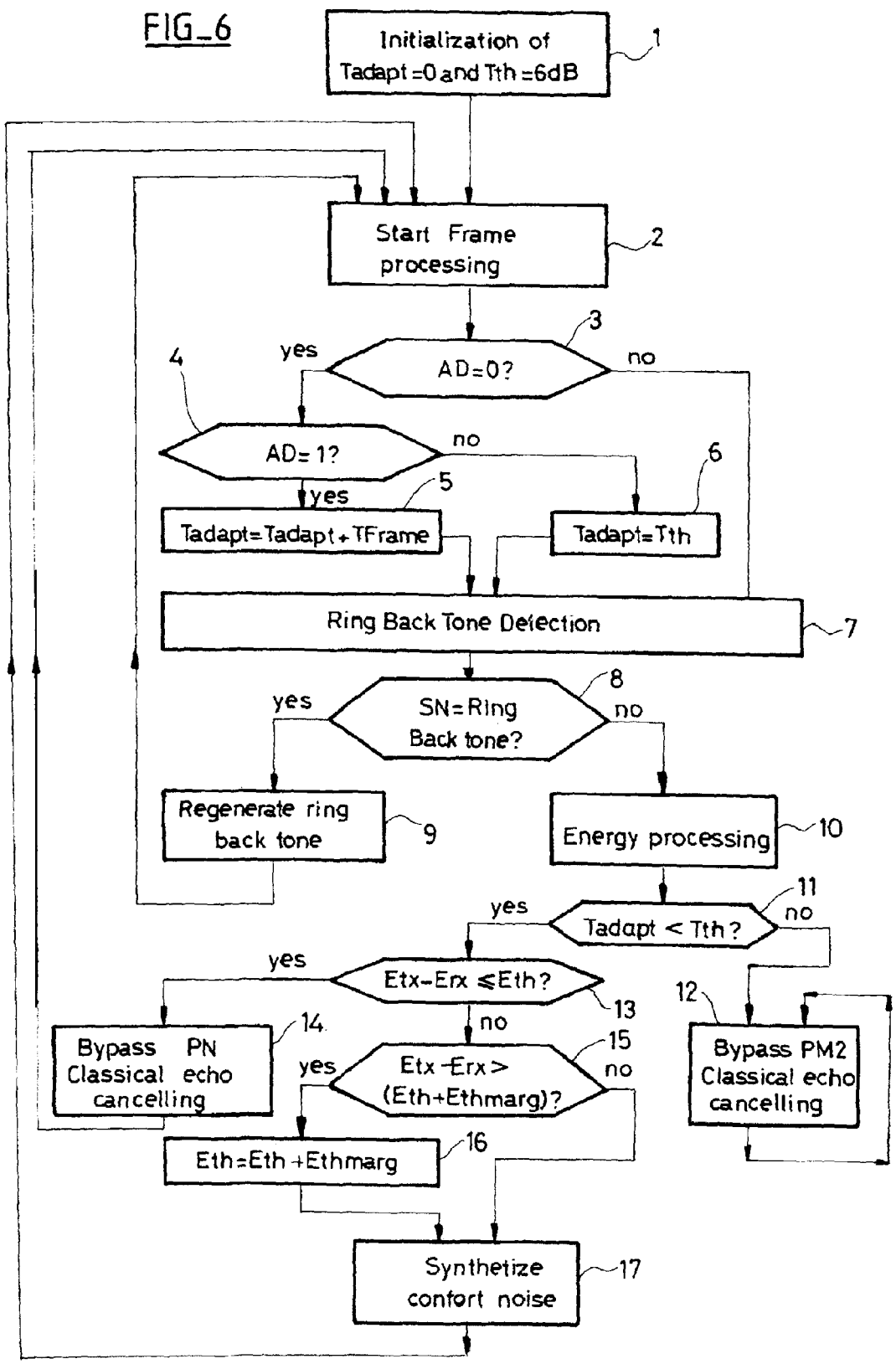

ECHO CANCELLER

BACKGROUND OF THE INVENTION

Field of the Invention

The present invention generally relates to an echo canceller for a digital telephone signal. It is peculiarly useful when a digital telephone terminal is connected to a "complex" telecommunication network. In the following description, "complex network" means network comprising at least one digital network connected to at least one analog network. Due to the analog network, there is a so-called hybrid echo. Hybrid echo is generated by the reflection of electrical energy by a line device called a hybrid (hence the term hybrid echo). Most telephone local loops are two-wire circuits while transmission facilities are four-wire circuits. A hybrid is used as an interface between a two-wire circuit and a four-wire circuit. Each hybrid produces echoes in both directions, though the far end echo is usually a greater problem for voice band.

A caller that uses a digital terminal to call a callee via an analog network can perceive the hybrid echo of his/her own background noise, during the ringing phase, i. e. before the callee picks up the handset of his/her telephone terminal.

For instance, the connection goes via a media gateway, an analog trunk, and an analog public switched telephone network. The network resources are opened before the callee picks up the handset. In some situations, the analog trunk causes an echo. So the noise of caller's environment returns back to the caller's terminal and, depending on the echo level and the signal level amplification applied in the caller's terminal, the echo of this noise can be disturbing.

FIG. 1 is a block diagram showing an exemplary complex network, and telephone terminals wherein an echo can be audible:

An Internet protocol telephone terminal T1 is linked to a local area or a wide area network N1.

A gateway G1 is linking the digital network N1 to a classical public telephone network N2 by an analog line AL1.

An analog telephone terminal T2 is linked to the classical public telephone network N2 by an analog line AL2.

For instance, the telephone terminal T1 is used by user A, in a room R, to call a distant telephone terminal T2. In this room R, or in a neighboring room, other people are speaking (for example they are working in an open space office). The brouhaha done by these people is low; user A may not pay attention to it. However the brouhaha is picked up by the micro of terminal T1. An echo E of this brouhaha is sent back by the analog network N2 to the terminal T1, via the gateway G1. The echo of the brouhaha is amplified by the terminal T1 if it is set up to provide some amplification to any received signal. User A can perceive the brouhaha in the handset of terminal T1. In some cases user A can listen to the speech of other people, in the handset of terminal T1, even if user A can not distinctly perceive this speech without the terminal T1. This induces some disturbances for user A: Even if the echo is low, the caller being focused on the callee's awaited response is disturbed by the echo. This disturbance lasts until the callee picks up the handset of the terminal T2.

In addition, this echo may generate some problem of confidentiality (for example in a hospital) because the background conversations are amplified.

For example, the transmitted signal corresponding to the brouhaha has a level of −50 dB and the caller's terminal is set to amplify the received signal with +15 dB.

1) During the call set up, there is a short period with no ring back tone. The echo attenuation is −6 dB even if a classical echo canceller is inserted on the link between the caller and the analog network (because the level of the received signal is not enough to allow the activation the adaptive filter of an echo canceller). Then the caller clearly perceives the brouhaha, because the level of the received signal is −41 dB. As the caller's attention is peculiarly concentrated on the awaited response, the caller may perceive some confidential information in this brouhaha.

2) During the ringing phase, the echo attenuation is −6 dB (because the level of the received signal is still not enough to allow the activation the adaptive filter of an echo canceller). Then the caller clearly perceives the brouhaha between the ring back tone periods, because the level of the received signal −41 dB; and, during the ring back tone periods, the caller perceives ring back tones that are downgraded by the echo of the brouhaha at the level of −41 dB.

3) As soon as the callee answers the call, the caller's attention is now directed to the callee's response, so the caller is less sensitive to the brouhaha. In addition, the echo canceller is now adjusting its adaptive filter to attenuate the echo. The echo is now attenuated by −20 dB. So the caller does not perceive the brouhaha anymore.

DESCRIPTION OF THE PRIOR ART

The caller may decrease the volume, in particular if he/she has previously increased the volume.

An echo canceller may be inserted on the connection path, either in the terminal or in the digital network. It works fine when the received signal has a high level. One may think of setting up the echo cancellation filter in order to reach a good echo rejection even when there is no speech signal. But it would lead to instability and divergence, especially when there is background noise in the environment of the distant user. This instability would cause echo. For this reason, in a classical echo canceller, the adaptive filtering is not applied on low level signals such as noise, to avoid instability. So a classical echo canceller doesn't reduce the echo of its own background.

FIG. 2 is the block diagram of a classical echo canceller. It is placed between a terminal and a complex network not represented. It comprises:

An input receiving a signal TXi sent by the terminal.

An output directly linked to the input receiving the signal TXi, and forwarding, to the network, a signal TXo identical to the signal TXi received from the terminal.

An input receiving a signal RXi supplied by the network and containing an echo signal E that is a part of the signal TXo sent to the network, which is sent back by the network.

An output supplying, to the terminal, a signal RXo obtained by processing the signal XRi in order to attenuate the echo signal E.

A linear processor, also called adaptive filter, AF1, having: a control input, a signal input coupled to the input receiving the signal TXi, and an output. It aims to generate a signal identical to the echo signal E and to be subtracted from the received signal RXi for cancelling the echo signal E.

A subtractor S1 having: a first input linked to the input receiving the signal RXi; a second input linked to the output of the adaptive filter AF1; and an output supplying a signal RXr that contains a residual part of the echo signal E.

A non linear processor NLP1 having: a signal input linked to the output of the subtractor S1, a control input, a first output linked to the output supplying the signal RXo.

A single talk detector STD and a double talk detector DTD for detecting:
- when the near end user is talking,
- when both the near end and the far end user are talking,
- when none is talking.

A control unit CU having inputs for receiving signals from the single talk detector STD and the double talk detector DTD, and having outputs for supplying control signals to the non linear processor NLP1 and to the adaptive filter AF1

The transmitted signal TXi is processed through the adaptive fitter AF1 in order to produce an echo estimate, when the control unit CU activates the adaptive filter AF1. This echo estimate is then subtracted from the received signal RXi. The difference between the two signals (i. e. the residual signal RXr) is then processed by the non linear processor NLP1 to remove the residual echo signal as far as possible, i. e. to attenuate the components that could not be removed by the linear filter AF1 and the subtractor S1 alone.

In current narrowband VoIP solutions, echo canceller performances must be compliant with the ITU-T recommendation G.168. This recommendation describes the characteristics of an echo canceller including the requirements for control mechanisms. It also describes a number of laboratory tests that should be performed on an echo canceller to assess its performance under conditions likely to be experienced in the network.

G.168 recommendation is applicable to the design of echo cancellers using digital techniques, and intended for use in circuits where the delay exceeds the limits specified by recommendations ITU-T G.114 and ITU-T G.131. In particular, packet networks based on IP transport protocol (i.e. VoIP) are known to introduce delays that exceed these limits.

The problem of echo during the ringing phase is not handled by the ITU G.168 recommendation in its present state. So even if an echo cancellation module is located in a terminal, or in a media gateway, and is compliant with the current G.168 recommendation, users can perceive an echo during the ringing phase.

Thus, there is a need to provide an improved echo canceller.

SUMMARY OF THE INVENTION

The object of the invention is an echo canceller comprising:
- an adaptive filter for receiving a signal affected by an echo, and for supplying a filtered signal that is an estimate of the echo;
- a subtractor for subtracting this estimate from the received signal and supplying a residual signal;

characterized in that it further comprises:
- means for detecting a ring back tone in said residual signal, comprising:
  - means for comparing the difference between the energy of the received signal and the energy of a transmitted signal with a first threshold, and then concluding that a ring back tone is detected when this difference is greater than this first threshold,
  - and means for comparing the energy of the transmitted signal to a second threshold, and comparing the cumulated time during which this energy is greater than the second threshold with a fourth threshold, then assuming that the ringing phase is elapsed when this cumulated time is greater than this fourth threshold;
- means for blocking the received signal and replacing it by a locally generated ring back tone if a ring back tone is detected in the received signal.

According to a preferred embodiment, the proposed echo canceller further comprises:
- a timer to determine a time period;
- and means for, during said time period, replacing the residual signal by some synthetic comfort noise when there is no ring back tone.

According to a peculiar embodiment, the means for replacing the residual signal by some synthetic comfort noise comprise means for replacing the received signal by some synthetic comfort noise only if the difference between the energy of the transmitted signal and the energy of the residual signal is greater than the current value of a threshold.

According to a peculiar embodiment, the means for means for replacing the residual signal by some synthetic comfort noise, comprise means for incrementing the current value of said threshold with a predetermined increment when the difference between the energy of the transmitted signal and the energy of the residual signal is greater the sum of the current value of the threshold and said increment.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which:

FIG. 1 (above described) is a block diagram showing an exemplary complex network, and telephone terminals wherein echo can be audible.

FIG. 2 (above described) is the block diagram of a classical echo canceller.

FIG. 3 is the block diagram of a first embodiment of the echo canceller according to the invention.

FIG. 4 is the block diagram of a second embodiment of the echo canceller according to the invention.

FIG. 5 is the block diagram of a part of this second embodiment.

FIG. 6 represents a flow chart of the process run in this second embodiment of the echo canceller according to the invention.

DETAILED DESCRIPTION OF THE PREFERRED EMBODIMENTS

FIG. 3 is the block diagram of a first embodiment of the echo canceller according to the invention, which comprises the same components as the classical echo canceller represented on FIG. 2, plus a preprocessing module PM1 inserted between the input receiving the signal RXi from the network, and the first input of the subtractor S1. This echo canceller is embedded in a gateway for instance.

The preprocessing module PM1 applies a specific non linear processing from the call set up request until the callee has picked up the phone (i. e. the end of the ringing phase) or until the caller speaks, which causes the convergence of the echo canceller. This non linear processing module PM1 cancels the echo during this period.

In a preferred embodiment, when there is no ring back tone, it replaces the removed signal by a synthesized comfort noise with the same statistical characteristics as the suppressed back ground noise.

When there are ring back tones, it replaces the removed signal by synthesized ring back tones.

After the callee has picked up the phone, or after the caller has begun to speak, the control unit CU de-activates the preprocessing module PM1, so that the classical echo cancelling process is applied.

FIG. 4 is the block diagram of a second embodiment of the echo canceller according to the invention, which comprises the same components as the classical echo canceller represented on FIG. 2, except that the non linear processor NLP1 is replaced by an improved non linear processor NLP2 integrating a preprocessing module PM2. A block diagram of this improved non linear processor NLP2 is represented on FIG. 5. It comprises:

A classical non linear processor CNLP similar to the non linear processor NLP1. It receives a signal supplied by the enhanced non linear processor EN, and it supplies the processed received signal RXo to the near end terminal.

The preprocessing module PM2 comprising a signal qualifier SQ for detecting a ring back tone, and an enhanced non linear processor EN.

The signal qualifier SQ receives the residual signal RXr provided by the output of the subtractor S2. It also receives a so called "Adaptation Signal" AD that is a control signal supplied by the control unit UC2 and that can take three values:

0 when control unit CU2 detects that the echo canceller EC3 cannot be in an "adaptation phase" i. e. the adaptive filter AF2 cannot be adapted because the received signal RXi signal is too low to enable a convergence to a stable filtering.

1 when control unit CU2 detects that the echo canceller EC3 is in its "adaptation phase".

2 when the control unit CU2 detects that the adaptive filter AF2 has just finished its "adaption phase", i. e. it is the beginning of a phone conversation.

The signal qualifier SQ provides the enhanced non linear processor EN with a binary signal SN indicating whether the residual signal RXr that it receives contains, or not, a ring back tone.

This improved non linear processor NLP2 fulfills the same functions as those described above for the combination of the preprocessing module PM1 and the non linear processor NLP1.

The preprocessing module PM1 uses two kinds of threshold:

An energy threshold: Eth

A convergence status and time threshold: CTth.

If the difference of the energies of the signals respectively present on the inputs TXi and RXi is greater than the threshold Eth, during the ringing phase, and if it is during an interval wherein there is no ring back tone, then the preprocessing module PM1 completely cancels the received signal and replaces it by a locally generated comfort noise;

and if it is during a ring back tone, then the preprocessing module PM1 completely cancels the received signal and replaces it by a locally generated ring back tone.

The threshold CTth is used by the signal qualifier SQ to detect the ringing phase. The energy of the transmitted signal on the input TXi is measured and is compared to a threshold MinEnergy. If the cumulated time, during which this energy is greater than the threshold MinEnergy is higher than the threshold CTth, then the ringing phase is assumed to be elapsed. Then the preprocessing module PM1 is disabled to avoid clipping the received signal RXi during speech transmission. So, as soon as the callee has picked up the handset of terminal T2, the preprocessing module PM1 stops the specific non linear processing.

FIG. 6 represents a flow chart of the process run in the enhanced non linear processor EN represented on FIG. 5. A similar process is run in the preprocessing module PM1 of FIG. 3:

Step 1: Initialization of the processing:

resetting the value of a timer Tadapt that will be used for stopping the filter adaptation process when the adaptation phase is supposed to be over, i. e. some time after the phone conversation has started, in order to let some time after the end of the ringing phase, for the convergence of the adaptive filter;

and resetting the value of a variable threshold Tth that will be used for comparing the energy Etx of the transmitted signal TXo and the energy Erx of the received signal RXi. The initialization value of Tth is 6 dB in this example.

Step 2: Starting the processing for a new received signal frame.

Step 3: Checking the value of the "Adaptation signal" AD. If the value is 0, it means that the echo canceller is not in the "adaptation phase"; the processing continues with step 7. If the value is not 0, it means that the echo canceller is in the "adaptation phase" (if value is 1) or has recently finished this adaption phase (if value is 2); the processing continues with step 4.

Step 4: Discriminating whether the value of the signal "Adaptation" is 1 or 2. If the value is 1, it means that the echo canceller is in the "adaptation phase"; the processing continues with step 5. If the value is 2, it means that the echo canceller has recently finished the "adaptation phase"; the processing continues with step 6.

Step 5: The timer Tadapt is incremented with a frame period (Tframe=10 ms in this example). The processing continues with step 7.

Step 6: The timer Tadapt is set to the maximal value Tth (1 second in this example). This value Tth is used as a threshold value to stop the adaptation process in a later step. So the processing will be stopped by this later step when the timer will have been incremented 100 times while processing 100 signal frames. The processing continues with step 7.

Step 7: Detecting a ring back tone in the residual signal RXr received by the enhanced non linear processor EN.

Step 8: Checking the signal SN supplied by the signal qualifier SQ to the enhanced non linear processor EN. If the signal SN indicates that a ring back tone is detected in the received signal RXr, then the processing continues with step 9. Otherwise it continues with step 10.

Step 9: The received signal RXr is replaced by locally generated ring back tones so that the user will clearly hear ring back tones without any echo.

Step 10: Determining the respective energies Etx and Erx of the transmitted signal TXo and of the residual signal RXr.

Step 11: Comparing the timer value Tadapt with the threshold Tth=1 second. If Tadapt is not lower than Tth, the processing, in preprocessing module PM2, comes to an end with step 12. If Tadapt is lower than Tth, the processing continues with step 13.

Step 12: The preprocessing module PM2 is bypassed, the echo canceller works now in the classical way. The output signal RXo is the received signal RXi classically filtered by the adaptive filter AF2 and the classical non linear processor CNLP. The processing continues with the same step 12 for the next frame.

Step 13: The difference between the energy Etx of the transmitted signal TXo and the energy Erx of the residual signal RXr is compared with the current value of the threshold Eth. If this difference is lower than, or equal to, Eth, the processing is ending with step 14 because the level of the residual signal RXr is high enough so that an echo cannot be disturbing anymore. Otherwise the processing continues with step 15 because the residual signal RXr is much tower than the transmitted signal, so one can suppose that it is mostly constituted by an echo.

Step 14: The preprocessing module PM2 is bypassed, the echo canceller works now in the classical way. The output signal RXo is the received signal RXi classically filtered by the adaptive filter AF2 and the classical non linear processor CNLP. The processing continues with step 2 for the next frame.

Step 15: The difference between the energy Etx of the transmitted signal TXo and the energy Erx of the residual signal RXr is compared with the sum of the current value of the threshold Eth and an increment Ethmarg. If this difference is lower than, or equal to, Eth, the processing is ending with step 17. Otherwise the processing continues with step 16.

Step 16: The current value of the threshold Eth is incremented with an increment Ethmarg that is 1 dB in this example. Then the processing is ending with step 17.

Step 17: The residual signal RXr is blocked. The restituted signal RXo supplied to the near end terminal is a synthesized comfort noise replacing the residual signal RXr. Then the processing continues with step 2 for the next frame.

The echo canceller according to the invention is peculiarly advantageous for telephone terminals that are used for full duplex hands-free modes. It may be embedded in:

Laptop/desktop PC-based soft phones, hardware IP phones, Smart phones, PDA phones, VoIP Media gateways,

IP PBX.

There is claimed:

1. An echo canceller comprising:
    an adaptive filter for receiving a signal affected by an echo, and for supplying a filtered signal that is an estimate of the echo;
    a subtractor for subtracting this estimate from the received signal and supplying a residual signal;
    means for detecting a ring back tone in said residual signal, comprising:
        means for comparing the difference between the energy of the received signal and the energy of a transmitted signal with a first threshold, and then concluding that a ring back tone is detected when this difference is greater than this first threshold,
        and means for comparing the energy of the transmitted signal to a second threshold, and comparing the cumulated time during which this energy is greater than the second threshold with a fourth threshold, then assuming that the ringing phase is elapsed when this cumulated time is greater than this fourth threshold;
    means for blocking the received signal and replacing it by a locally generated ring back tone when a ring back tone has been detected in the received signal, and until the ringing phase is assumed to be elapsed.

2. An echo canceller according to claim 1, further comprising:
    a timer to determine a time period;
    and means for, during said time period, replacing the residual signal by some synthetic comfort noise when there is no ring back tone.

3. An echo canceller according to claim 2, wherein said means for replacing the residual signal by some synthetic comfort noise, comprise means for replacing the received signal by some synthetic comfort noise only if the difference between the energy of the transmitted signal and the energy of the residual signal is greater than the current value of a threshold.

4. An echo canceller according to claim 3, wherein said means for replacing the residual signal by some synthetic comfort noise, comprise means for incrementing the current value of said threshold with a predetermined increment when the difference between the energy of the transmitted signal and the energy of the residual signal is greater than the sum of the current value of the threshold and said increment.

* * * * *